(12) United States Patent
Koike

(10) Patent No.: US 7,002,531 B2
(45) Date of Patent: Feb. 21, 2006

(54) SYSTEM AND METHOD FOR DRIVING A DISPLAY

(75) Inventor: Kunio Koike, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 463 days.

(21) Appl. No.: 10/090,159

(22) Filed: Mar. 5, 2002

(65) Prior Publication Data

US 2002/0122013 A1 Sep. 5, 2002

(30) Foreign Application Priority Data

Mar. 5, 2001 (JP) ............................. 2001-060714

(51) Int. Cl.
G09G 5/00 (2006.01)
(52) U.S. Cl. ......................................... 345/3.1; 345/82
(58) Field of Classification Search .................. 368/30, 368/82, 83, 84, 223, 241, 242; 345/1.1, 1.3, 345/3.1, 45, 87, 204, 205, 206, 761, 788, 345/82, 83, 99, 34, 39, 51, 52
See application file for complete search history.

(56) References Cited

U.S. PATENT DOCUMENTS

| | | | | |
|---|---|---|---|---|
| 3,984,973 A | * | 10/1976 | Ho | ............................. 368/241 |
| 5,101,116 A | * | 3/1992 | Morokawa | .................... 327/126 |
| 5,898,442 A | * | 4/1999 | Takebe | ......................... 345/531 |
| 6,069,593 A | * | 5/2000 | Lebby et al. | .................. 345/1.1 |
| 2001/0018809 A1 | * | 9/2001 | Heropoulos et al. | ........... 40/544 |
| 2004/0037173 A1 | * | 2/2004 | Fujisawa | ..................... 368/204 |

FOREIGN PATENT DOCUMENTS

| GB | 2 286 262 A | 8/1995 |
|---|---|---|
| JP | 5-61428 | 3/1993 |

* cited by examiner

Primary Examiner—Chanh Nguyen
(74) Attorney, Agent, or Firm—Oliff & Berridge, PLC

(57) ABSTRACT

The present invention provides a controller of a panel driver that makes a determination as to the display color by which information to be displayed is displayed, reports a driving method corresponding to this display color to a driving method control circuit, and reports a driving voltage corresponding to this display color to a driving voltage control circuit. As a result of such a process, a driving method and a driving voltage suitable for the display color are selected. Additionally, it becomes possible for a single panel driver to drive an LCD and an organic electro luminescence panel at the same time without providing a dedicated driver for each of these two panels.

16 Claims, 14 Drawing Sheets

[Fig. 1]
(A)
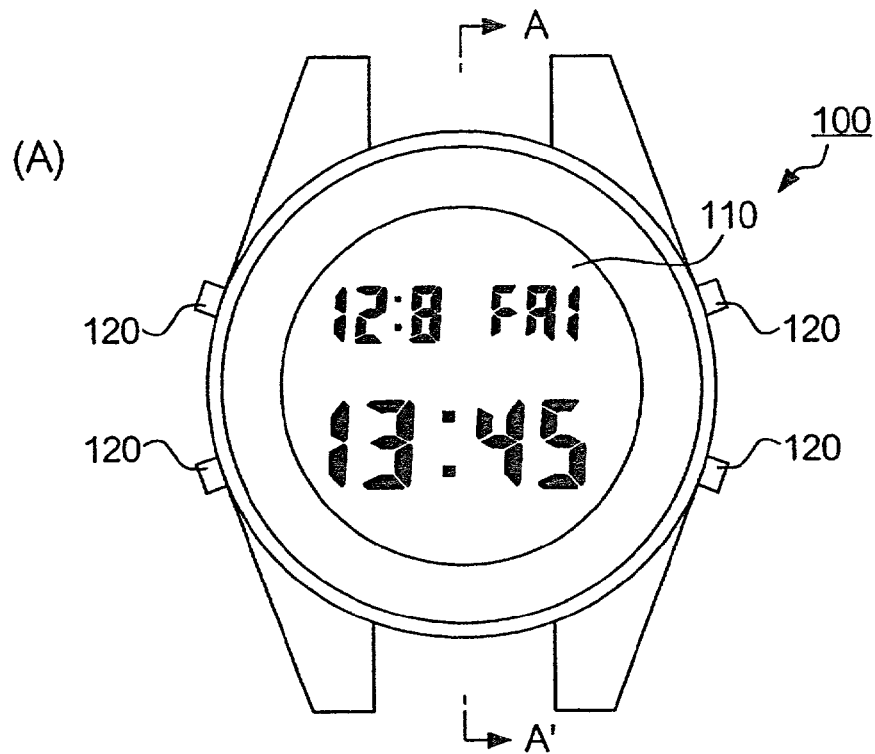
(B)
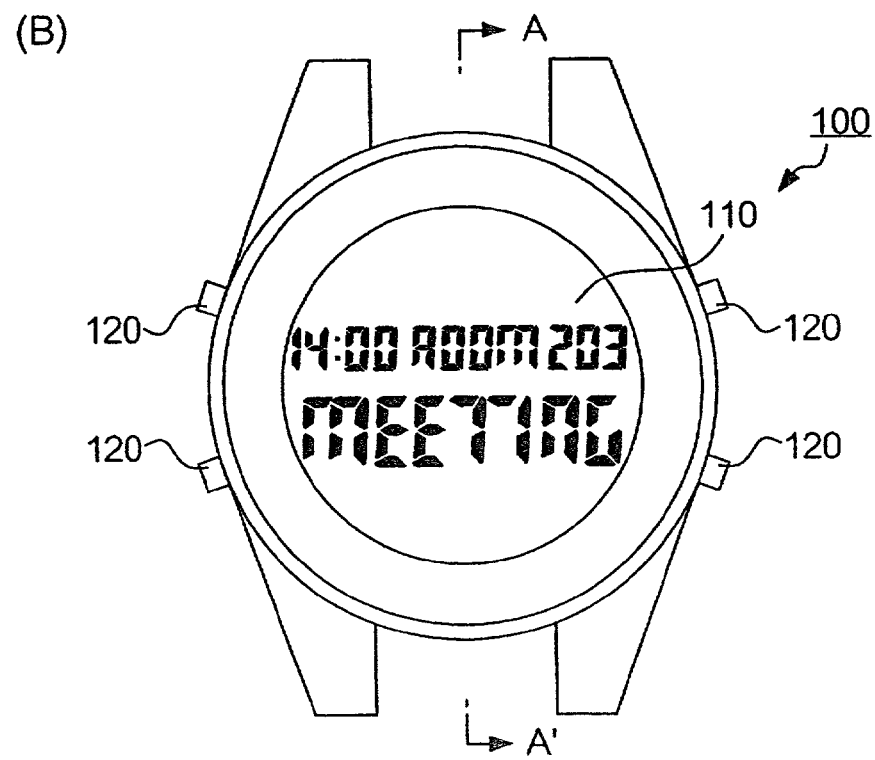

[Fig. 2]
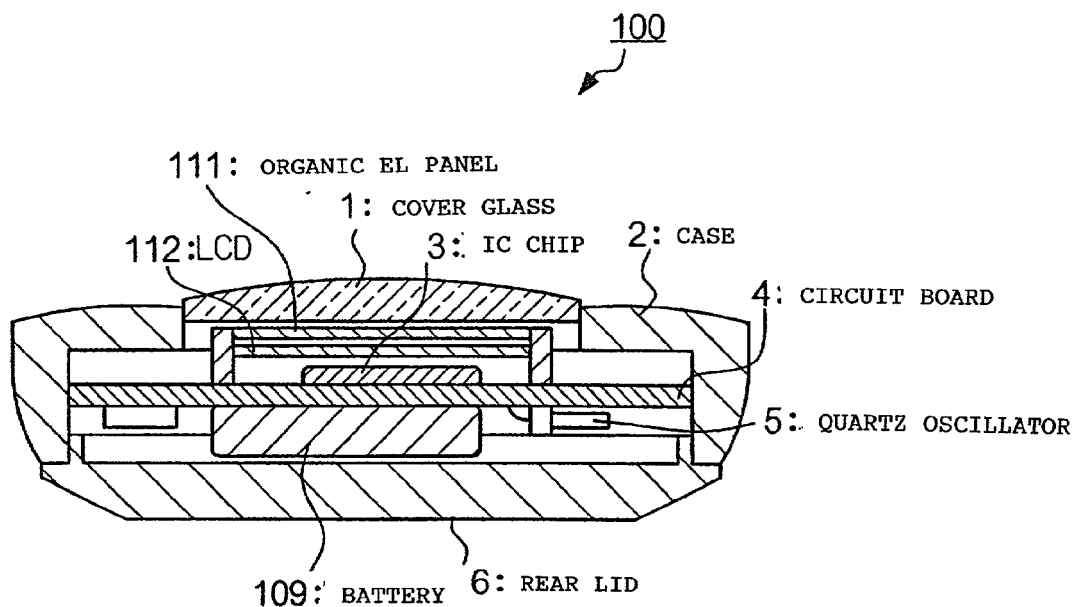
[Fig. 3]
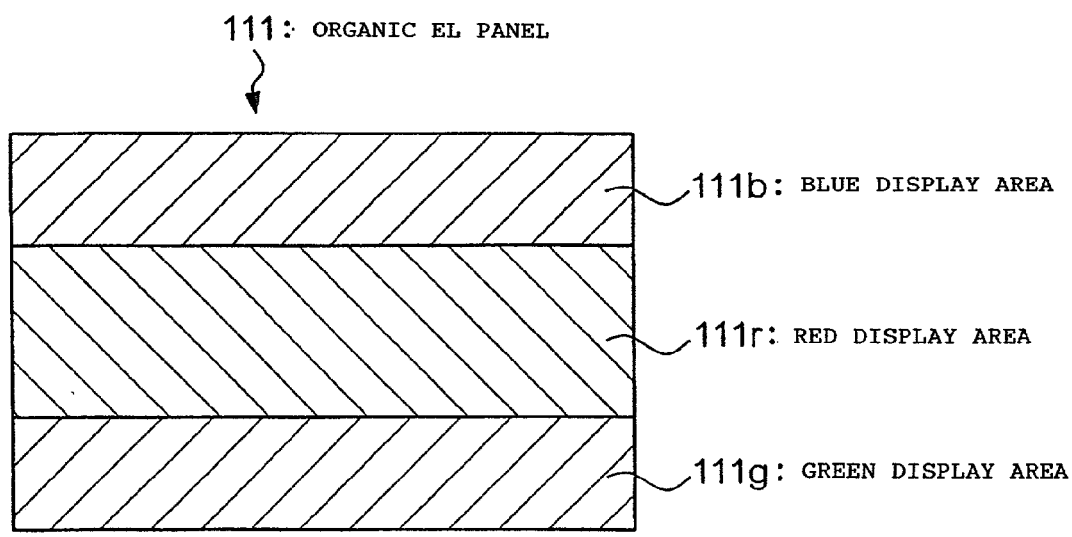

[Fig. 4]
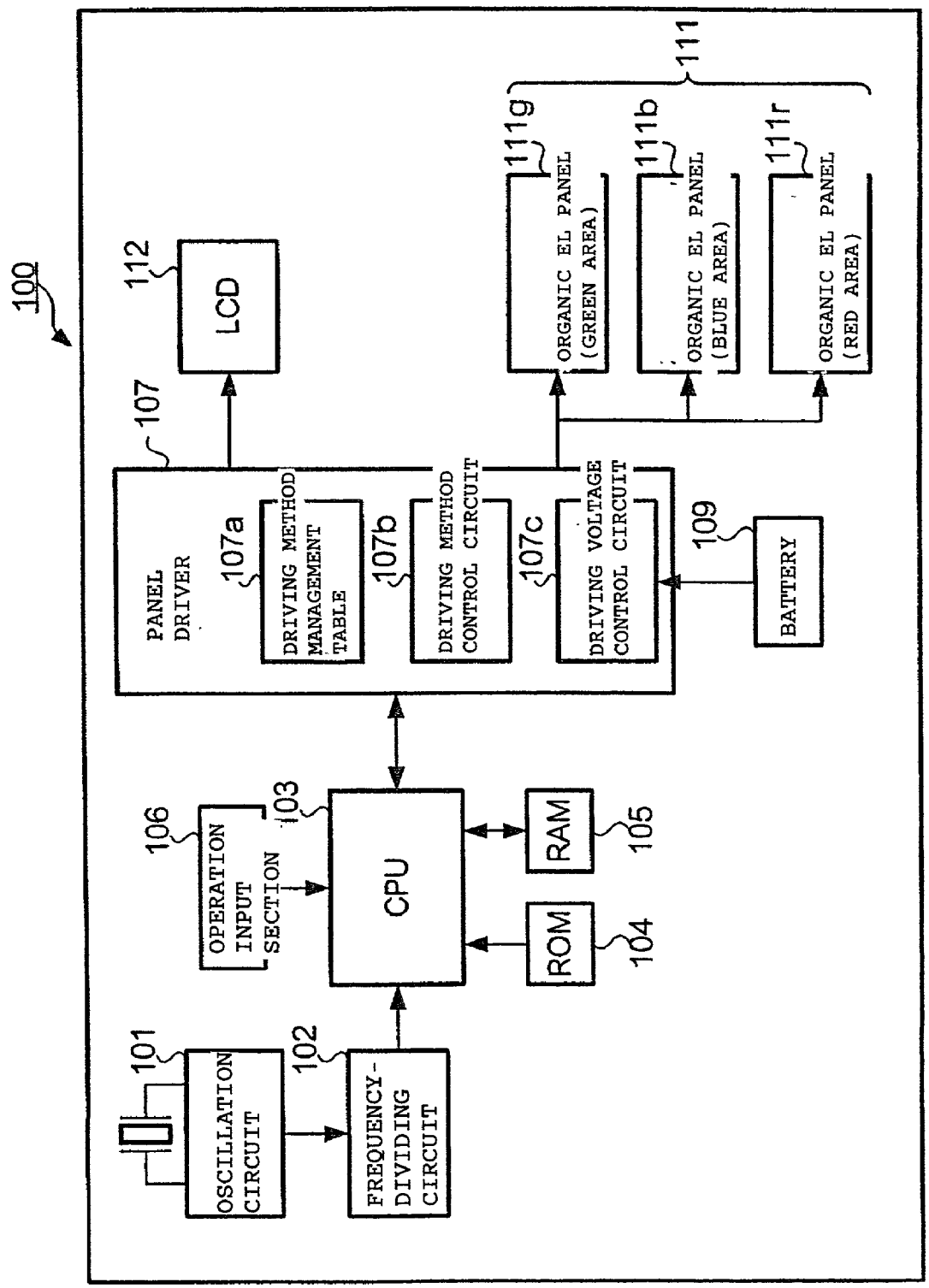

[Fig. 5]

| SCHEDULE DATE | SCHEDULE TIME | SCHEDULE CONTENTS | DISPLAY START TIME | DISPLAY PERIOD | DISPLAY AREA |
|---|---|---|---|---|---|
| DEC. 8 2001 | 14:00 | ROOM203 MEETING | 13:55 | 10 SECS | RED DISPLAY AREA 111r |
| ...... | ...... | ...... | ...... | ...... | ...... |
| ...... | ...... | ...... | ...... | ...... | ...... |
| ...... | ...... | ...... | ...... | ...... | ...... |
| ...... | ...... | ...... | ...... | ...... | ...... |
| ...... | ...... | ...... | ...... | ...... | ...... |
| ...... | ...... | ...... | ...... | ...... | ...... |
| ...... | ...... | ...... | ...... | ...... | ...... |

[Fig. 6]
(A)
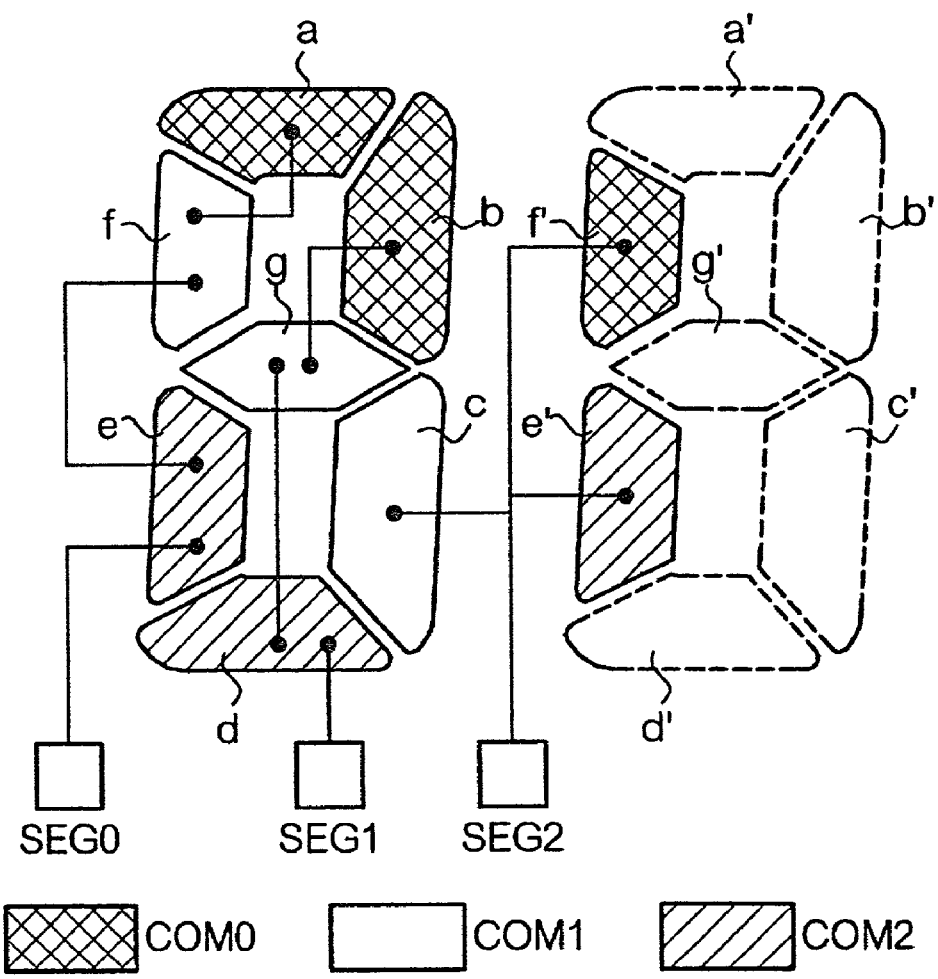
(B)
|  | COM0 | COM1 | COM2 |
|---|---|---|---|
| SEG0 | a | f | e |
| SEG1 | b | g | d |
| SEG2 | f' | c | e' |

[Fig. 7]
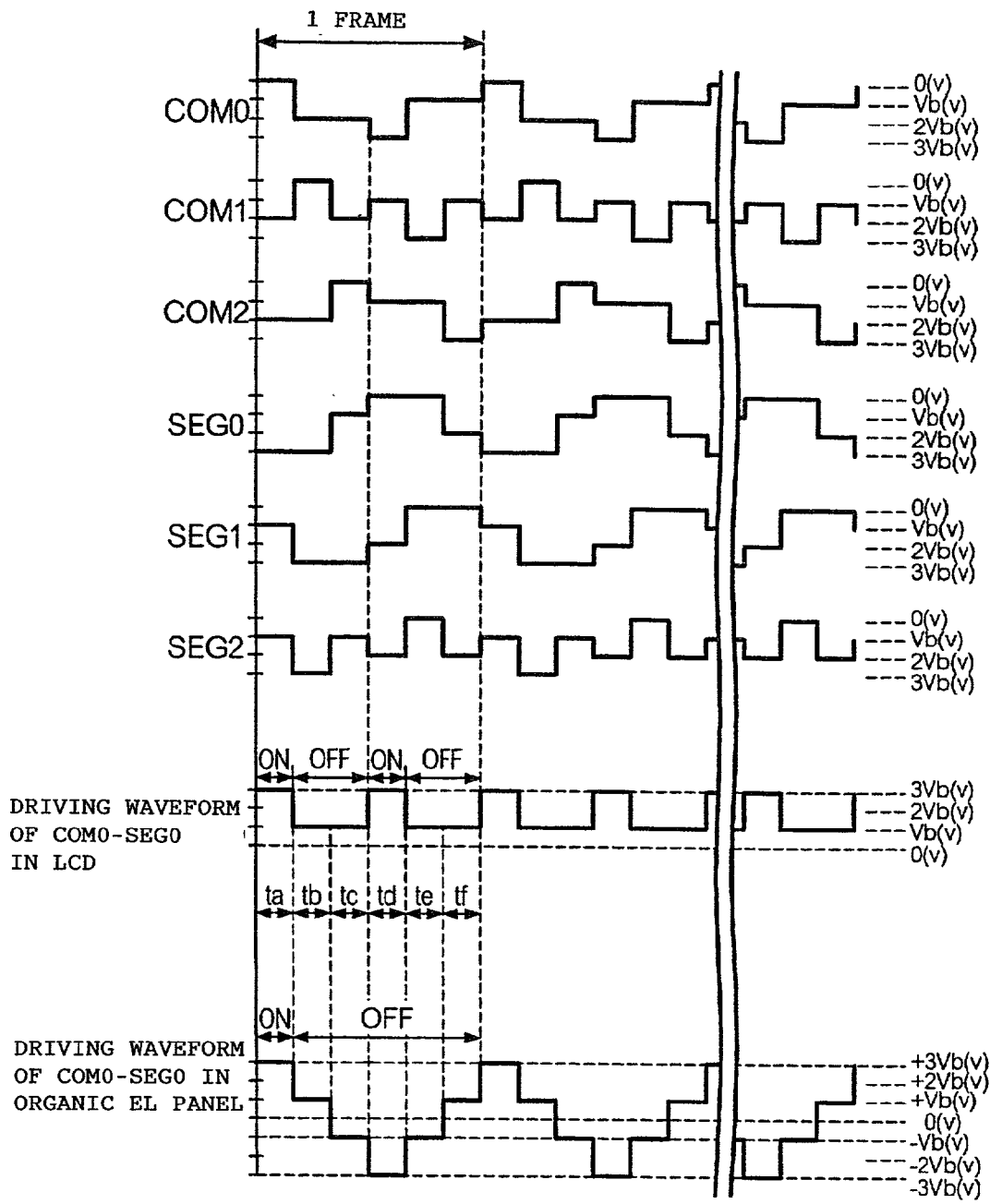

[Fig. 8]
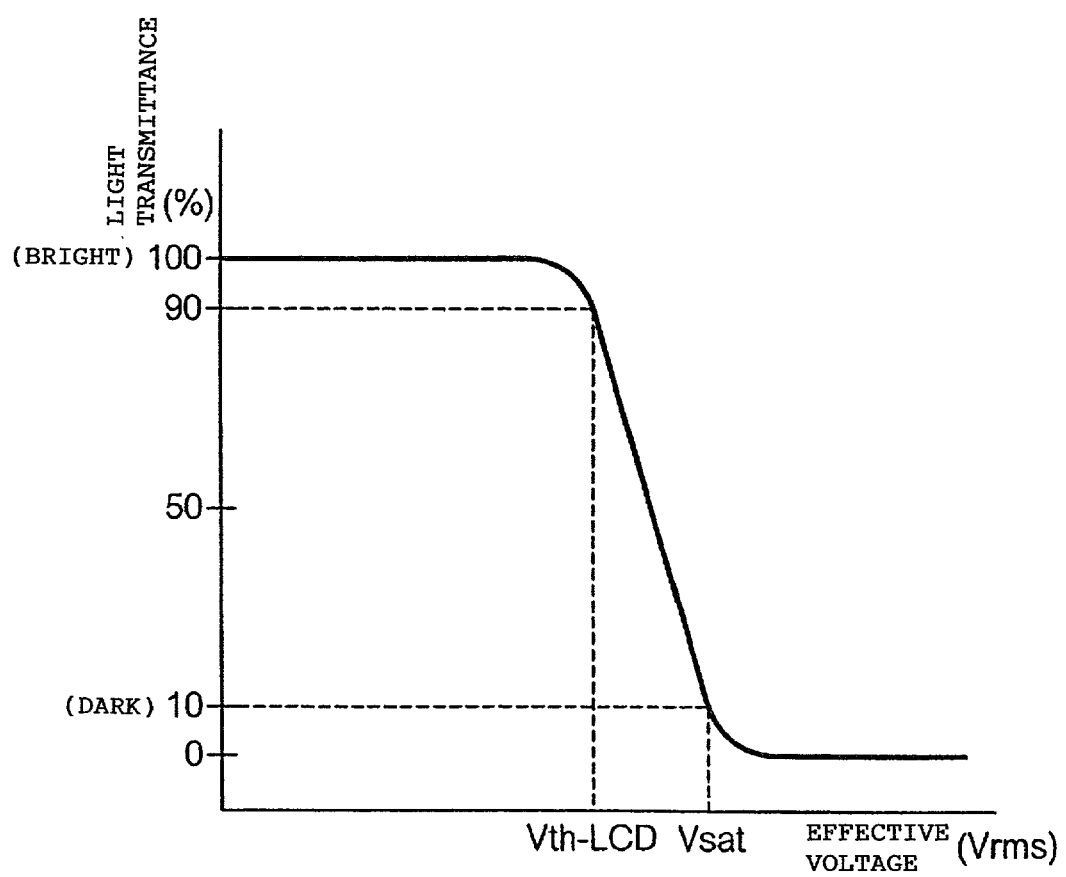

[Fig. 9]
(A)
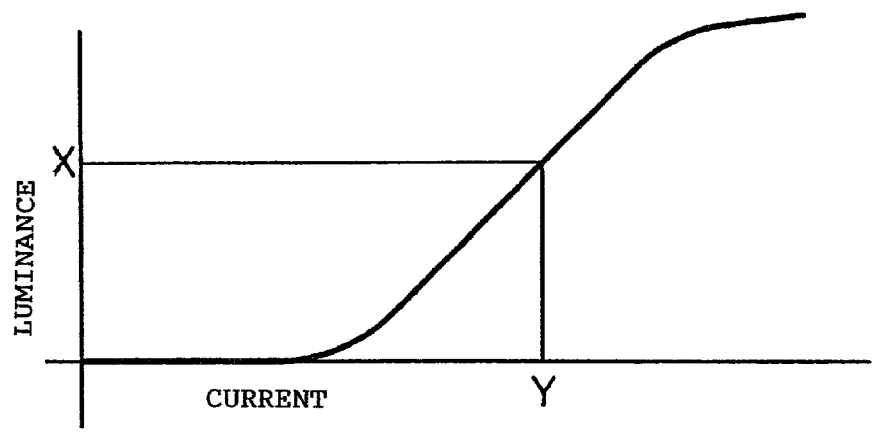
(B)
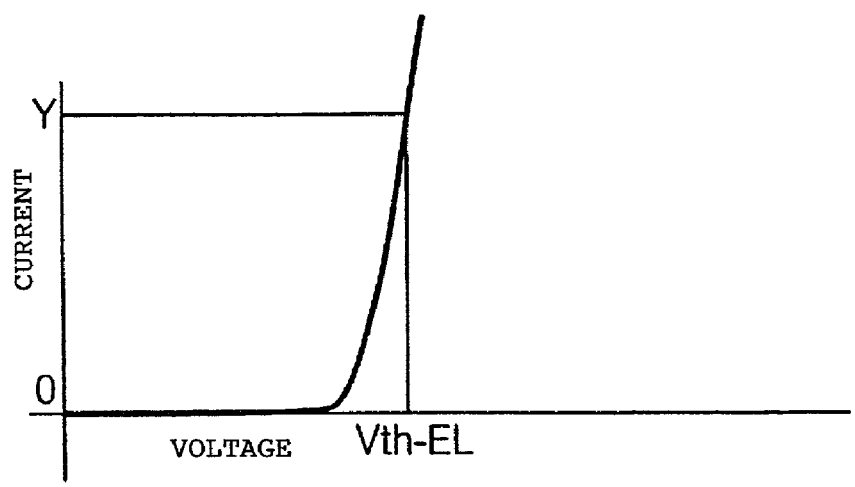

[Fig. 10]
(A)
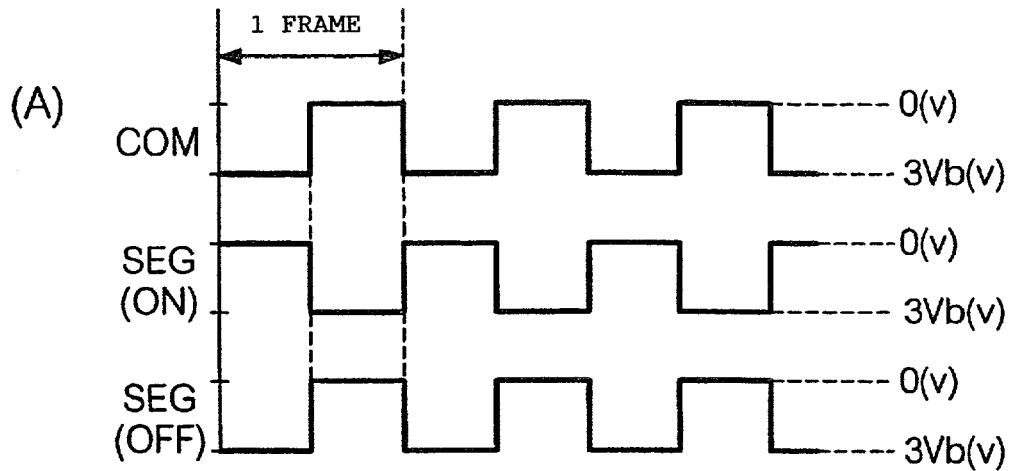
(B)
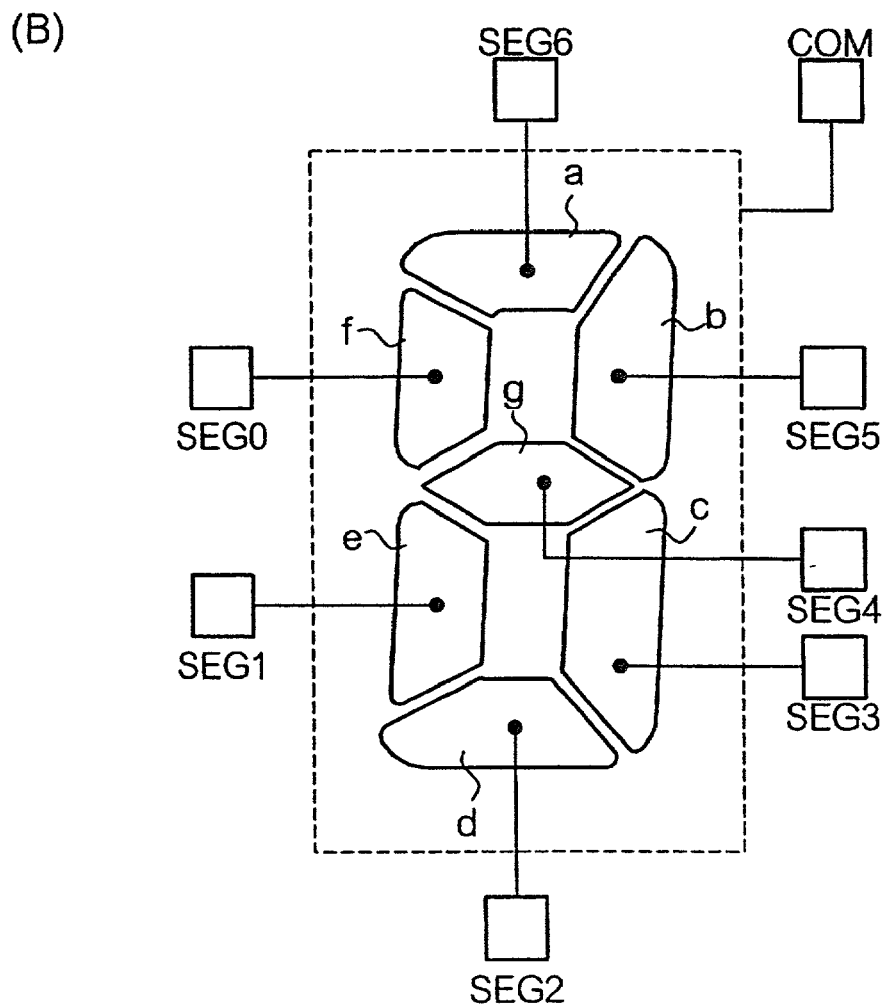

[Fig. 11]
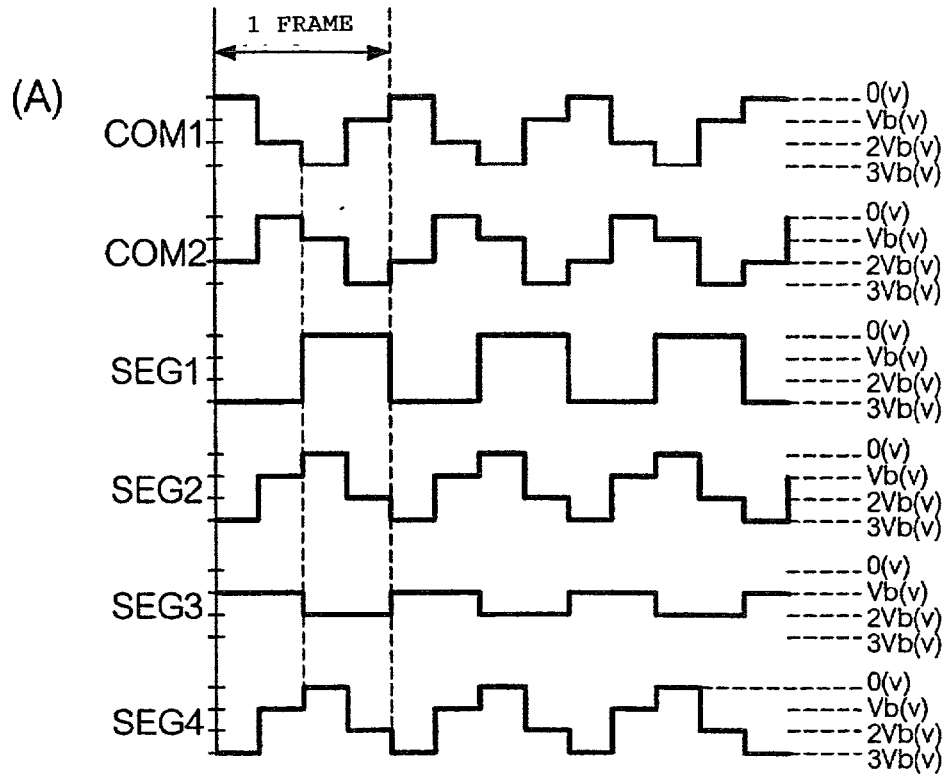
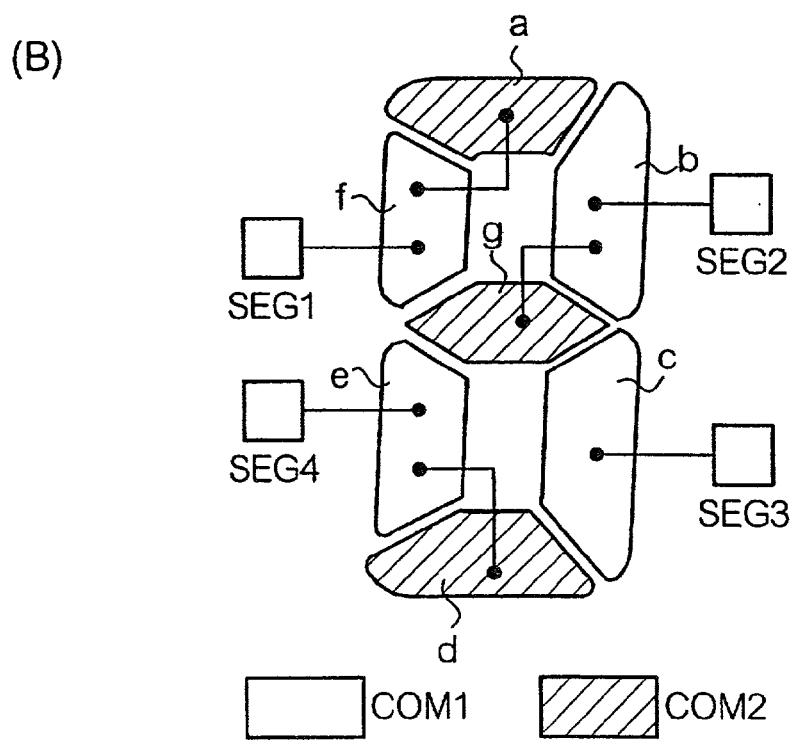

[Fig. 12]

| DISPLAY COLOR | GREEN | RED | BLUE |
|---|---|---|---|
| DRIVING METHOD | 1/3 DUTY | 1/2 DUTY | STATIC |
| DRIVING VOLTAGE 3Vb(V) | 4.2 | 4.5 | 6.0 |

[Fig. 13]

| THRESHOLD VOLTAGE OF LCD: Vth-LCD | 2.0(v) | 2.0(v) | 2.0(v) |
|---|---|---|---|
| REQUIRED VOLTAGE OF ORGANIC EL PANEL: Vth-EL | 3.0(v): GREEN | 4.0(v): RED | 5.0(v): BLUE |
| DRIVING METHOD | 1/3 DUTY | 1/2 DUTY | STATIC |
| LCD DRIVING VOLTAGE: Vb(v) | 1.4 | 1.5 | 2.0 |
| ON VOLTAGE OF LCD: Von-LCD(v) | 2.68 | 3.35 | 6.0 |
| OFF VOLTAGE OF LCD: Voff-LCD(v) | 1.4 | 1.5 | 0 |
| ON VOLTAGE OF ORGANIC EL PANEL: Von-EL(v) | 4.2 | 4.5 | 6.0 |

[Fig. 14]

| THRESHOLD VOLTAGE OF LCD: Vth-LCD | 2.0(v) | 2.0(v) | 2.0(v) | 2.0(v) | 2.0(v) |
|---|---|---|---|---|---|
| REQUIRED VOLTAGE OF ORGANIC EL PANEL: Vth-EL | 3.0(v): GREEN | 4.0(v): RED | 4.0(v): RED | 5.0(v): BLUE | 5.0(v): BLUE |
| DRIVING METHOD | 1/3 DUTY | 1/3 DUTY | 1/3 DUTY | 1/3 DUTY | 1/3 DUTY |
| LCD DRIVING VOLTAGE: Vb(v) | 1.4 | 1.5 | 1.6 | 1.8 | 2.0 |
| ON VOLTAGE OF LCD: Von-LCD(v) | 2.68 | 2.87 | 3.06 | 3.44 | 3.82 |
| OFF VOLTAGE OF LCD: Voff-LCD(v) | 1.4 | 1.5 | 1.6 ▲ | 1.8 ▲ | 2.0 × |
| ON VOLTAGE OF ORGANIC EL PANEL: Von-EL(v) | 4.2 | 4.5 | 4.8 | 5.4 △ | 6.0 |

[Fig. 15]
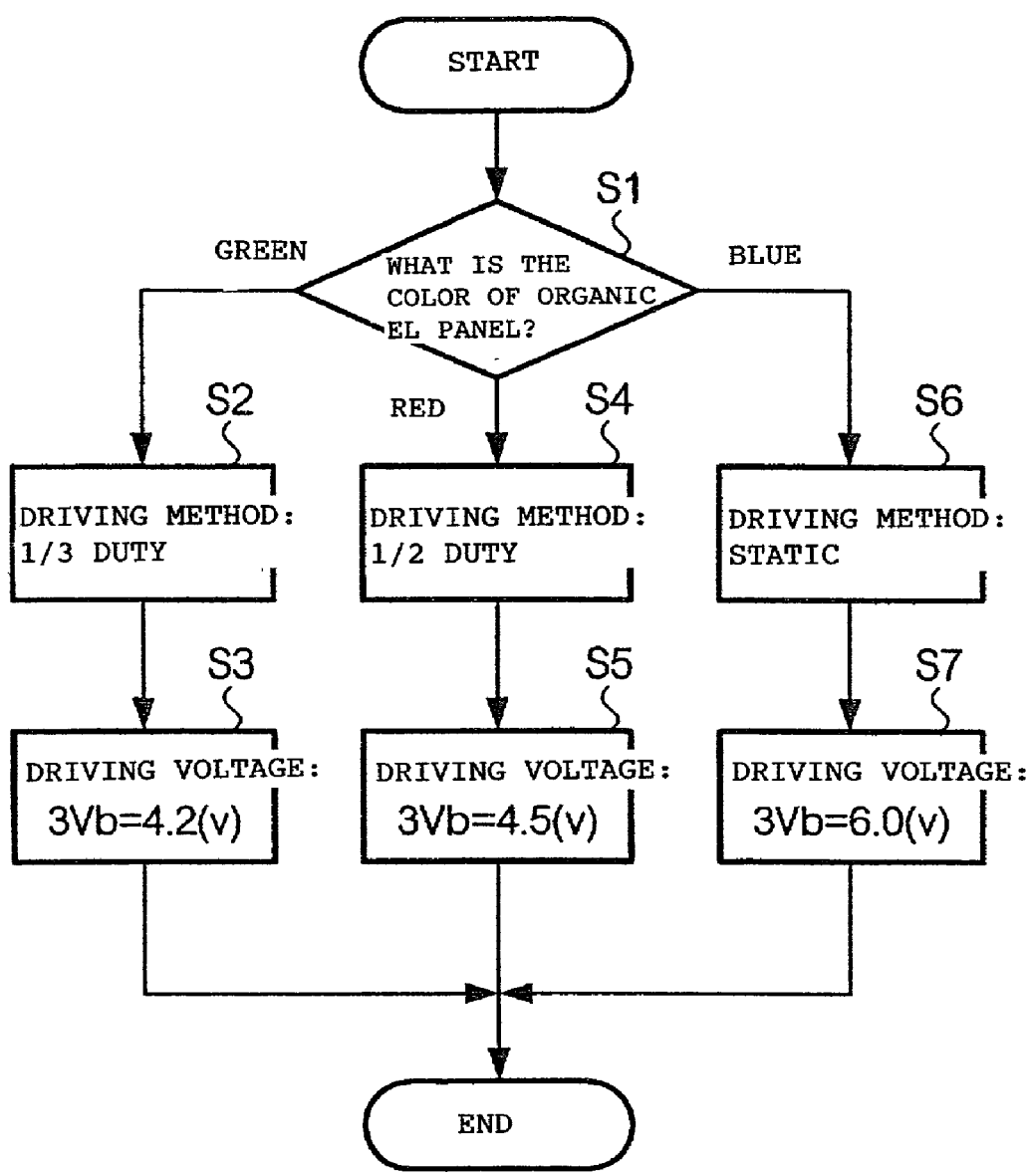

[Fig. 16]
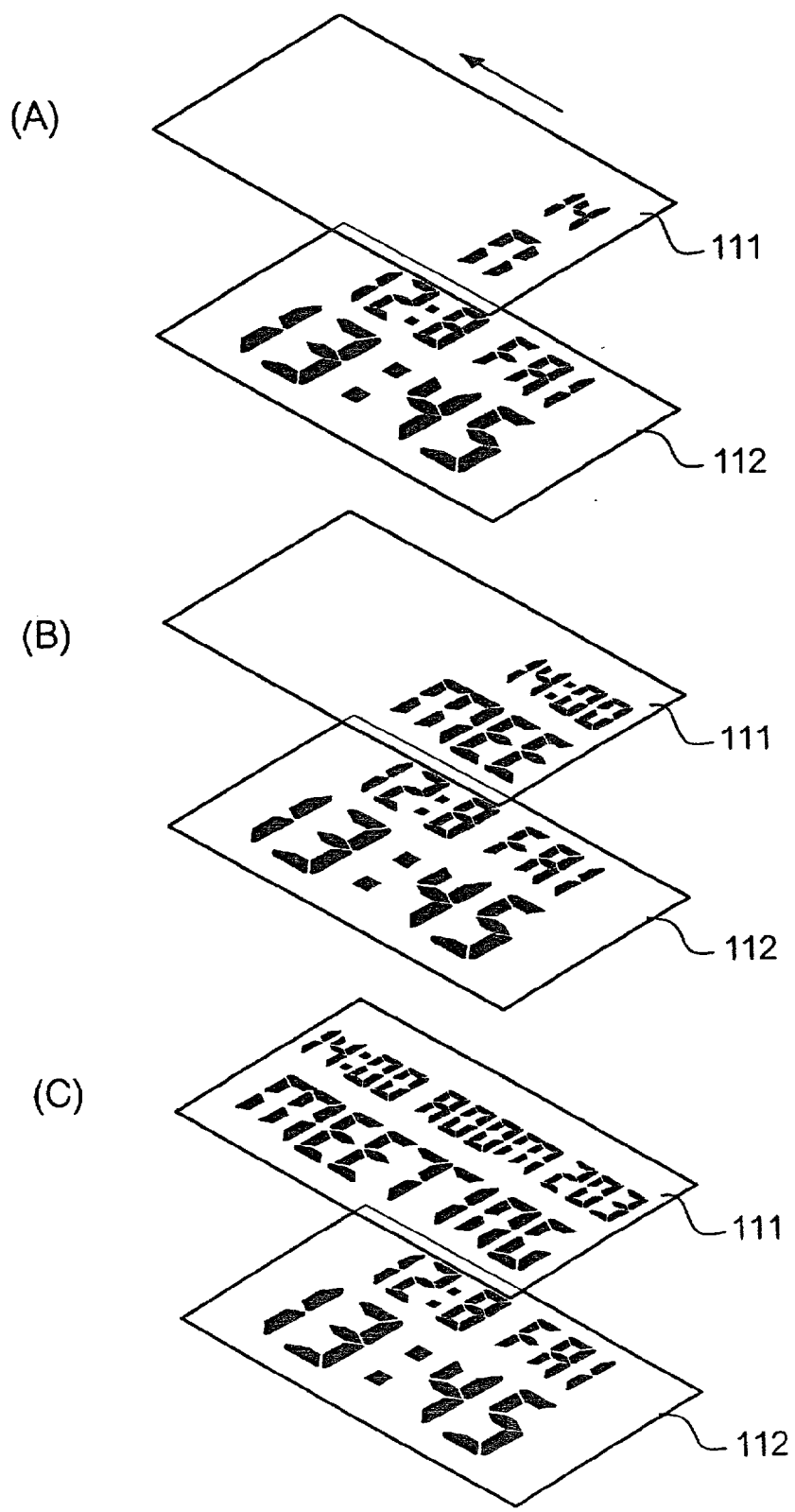

SYSTEM AND METHOD FOR DRIVING A DISPLAY

BACKGROUND OF THE INVENTION

1. Field of Invention

The present invention relates to a panel driving control device for driving a liquid-crystal panel and an organic electro luminescence (EL) panel, a wristwatch-type information device and a portable device having this panel driving control device, and a panel driving control method for driving a liquid-crystal panel and an organic EL panel.

2. Description of Related Art

Liquid-crystal panels (hereinafter referred to as "LCDs") are known as thin display devices. These LCDs have the advantage of being driven with low power consumption, however have the drawback of narrow viewing angle.

In order to minimize such narrow viewing angle drawbacks, there is provided an organic EL (Electro Luminescence) panel. The development of this organic EL panel is making progress toward practical utilization. The most striking feature thereof is the spontaneous light-emitting-type display. For this reason, the organic EL panel does not have a characteristic dependent on the viewing angle unlike an LCD, and therefore has attracted attention as a next-generation display suitable for, in particular, portable devices, such as wristwatches or portable phones.

SUMMARY OF THE INVENTION

Organic EL panels do have a problem in that the power consumption (in particular, the current consumption) is large, and reduction thereof is considered to be a technical challenge. For example, in LCDs of ordinary digital wristwatches, whereas the current consumption thereof is approximately 1 $\mu$A, the current consumption of organic EL panels is approximately 1 mA. That is, organic EL panels require a current consumption approximately 1,000 times larger than that of LCDs of the same size. When the capacity of a battery mounted in a wristwatch is considered, it is estimated that the battery capacity will be exhausted in several days while the organic EL panel emits light.

Therefore, in the current situation, a usage method is considered in which, even if an organic EL panel is mounted in a portable device, information is not always displayed in this organic EL panel, and information is displayed only for a limited time. For example, in a device both an LCD and an organic EL panel can be mounted in advance having a schedule management function, the LCD is made to display information, such as time information, which is always required by a user, and the organic EL panel can be made to display a message which reports a schedule only when that schedule arrives. As a result, the power consumed by the organic EL panel is reduced as much as possible.

Here, a description is given of the difference between the method of driving an LCD and that of driving an organic EL panel.

For the LCD, generally, an AC voltage is applied thereto in order to drive it. The reason for this is that, if a DC voltage is continuously applied to the LCD, a "polarization" phenomenon occurs, and the performance deteriorates. Accordingly, as a method of driving the LCD, for example in a digital watch, a method is adopted in which an AC waveform having a frame frequency of approximately 25 to 60 Hz is used.

In contrast, for the organic EL panel, a DC voltage is applied thereto in order to drive it. The reason for this is that the organic EL panel has a characteristic of emitting light as a result of causing an electrical current to continuously flow in a fixed direction.

Due to such a difference in driving methods, a dedicated driver capable of applying an AC voltage is used for the LCD, whereas a dedicated driver capable of applying a DC voltage is used for the organic EL panel.

Therefore, when both an LCD and an organic EL panel are to be mounted in a portable device, individual dedicated drivers for driving these become necessary, leading to an increased manufacturing cost and an increased number of manufacturing steps for the portable device. Also, in a relatively small portable device, such as a wristwatch, providing a mounting space for each of these dedicated drivers becomes a problem.

The present invention has been made in view of such a background. An object of the present invention is to provide a panel driving control device, a wristwatch-type information device, a portable device, and a panel driving control method which are capable of driving an LCD and an organic EL panel without providing individual dedicated drivers for these two panels.

In order to solve the above-described problems, a first construction of the present invention provides a panel driving control device can include a liquid-crystal panel control device for controlling the driving of a liquid-crystal panel by applying an AC voltage to the panel, an organic-EL-panel control device for controlling the driving of an EL (Electro Luminescence) panel by applying an AC voltage to the organic EL panel, and a frequency supply device for supplying, to the liquid-crystal panel control device and the organic-EL panel control device, a driving frequency which is required by the organic EL panel so that an object to be displayed is displayed without flicker when the organic EL panel is AC-driven. The liquid-crystal panel control device and the organic-EL-panel control device controlling the driving on the basis of the driving frequency supplied by the frequency supply device.

According to this construction, a driving frequency which is required for the organic EL panel to display an object to be displayed without flicker when the organic EL panel is AC-driven is supplied to the liquid-crystal panel control device and the organic-EL panel control device. The liquid-crystal panel control device applies an AC voltage to the liquid-crystal panel on the basis of this driving frequency in order to control the driving of the liquid-crystal panel. The organic-EL-panel control device applies an AC voltage to the organic EL panel on the basis of this driving frequency in order to control the driving of the organic EL panel.

The second construction of the present invention is such that, in the first construction, the driving frequency supplied from the frequency supply device is approximately twice the driving frequency which is normally required for the liquid-crystal panel to be driven.

A third construction of the present invention is such that, in the first construction, the driving frequency supplied by the frequency supply device is a frequency which is equal to or higher than 50 Hz.

A fourth construction of the present invention can include a liquid-crystal panel control device for controlling the driving of a liquid-crystal panel by applying an AC voltage to the liquid-crystal panel, an organic-EL-panel control device for controlling the driving of an organic EL panel by applying an AC voltage to the organic EL panel for displaying a single color, and a voltage supply device for supplying to the liquid-crystal panel control device and the organic-EL-panel control means, a driving voltage by which the on/off state of both the liquid-crystal panel and the organic EL panel can be controlled by a common driving method. The liquid-crystal panel control device and the organic-EL-panel control device controlling the driving on the basis of the supplied driving voltage.

According to this construction, a driving voltage by which the on/off state of both the liquid-crystal panel and the organic EL panel can be controlled by a common driving method is supplied to the liquid-crystal panel control device and the organic EL panel control device. The liquid-crystal panel control device and the organic EL panel control device control the driving on the basis of the supplied driving voltage.

A fifth construction of the present invention is such that, in the fourth construction, the driving voltage supplied by the common driving method and the voltage supply device is determined by the single color displayed on the organic EL panel.

A sixth construction of the present invention can include a liquid-crystal panel control device for controlling the driving of a liquid-crystal panel by applying an AC voltage to the liquid-crystal panel, an organic-EL-panel control device for controlling the driving of an organic EL panel by applying an AC voltage to the organic EL panel for displaying a plurality of colors, a driving method selection device for selecting a driving voltage and a driving method for driving the liquid-crystal panel and the organic EL panel in accordance with the display color displayed by the organic EL panel, a driving method reporting device for reporting the driving method selected by the driving method selection device to the liquid-crystal panel control device and the organic-EL-panel control device, and a driving voltage supply device for supplying the driving voltage selected by the driving method selection device to the liquid-crystal panel control device and the organic-EL-panel control device. The liquid-crystal panel control device and the organic-EL-panel control device controlling the driving by the driving method reported by the driving method reporting device on the basis of the driving voltage supplied by the driving voltage supply device.

According to this construction, a driving voltage and a driving method for driving the liquid-crystal panel and the organic EL panel are selected according to the display color displayed by the organic EL panel. The selected driving method is reported to the liquid-crystal panel control device and the organic-EL-panel control device, and the selected driving voltage is supplied to the liquid-crystal panel control device and the organic-EL-panel control device. The liquid-crystal panel control device and the organic-EL-panel control device control panel driving in accordance with the reported driving method on the basis of the supplied driving voltage.

A seventh construction of the present invention is such that, in the sixth construction, the driving method selection device selects a driving voltage suitable for driving a display color displayed by the organic EL panel from among a plurality of driving voltages of different magnitudes, and selects a driving method of a duty ratio suitable for driving a display color to be displayed by the organic EL panel from among a plurality of driving methods of different duty ratios.

An eighth construction of the present invention is a wristwatch-type information device having mounted therein, having a panel driving control device of to one of the first to seventh constructions, a liquid-crystal panel whose driving is controlled by the panel driving control device, an organic EL panel whose driving is controlled by the panel driving control device, a power-supply device for supplying power to the panel driving control device, and a clock supply device for supplying, to the panel driving control device, a clock signal required for the device to perform driving control.

A ninth construction of the present invention is a portable device having mounted therein, having a panel driving control device of one of the first to seventh constructions, a liquid-crystal panel whose driving is controlled by the panel driving control device, an organic EL panel whose driving is controlled by the panel driving control device, a power-supply device for supplying power to the panel driving control device, and a clock supply device for supplying, to the panel driving control device, a clock signal required for the device to perform driving control.

A tenth construction of the present invention can include a frequency supply step of supplying a driving frequency which is required for an organic EL panel to display an object to be displayed without flicker when the organic EL panel is AC-driven a liquid-crystal panel driving control step of controlling the driving of the liquid-crystal panel by applying an AC voltage to the panel on the basis of the supplied driving frequency, an organic-EL-panel driving control step of controlling the driving of the organic EL panel by applying an AC voltage to the panel on the basis of the supplied driving frequency.

According to this construction, a driving frequency which is required for the organic EL panel to display an object to be displayed without flicker when the panel is AC-driven is supplied. An AC voltage is applied to the liquid-crystal panel on the basis of this driving frequency in order to control the driving of the panel, and an AC voltage is applied to the organic EL panel on the basis of this driving frequency in order to control the driving of the panel.

An eleventh construction of the present invention is such that, in the tenth construction, the driving frequency supplied in the frequency supply step is approximately twice the driving frequency which is normally required for the liquid-crystal panel to be driven.

A twelfth construction of the present invention is such that, in the tenth construction, the driving frequency supplied in the frequency supply step is a frequency which is equal to or higher than 50 Hz.

A thirteenth construction of the present invention can include a voltage supply step of supplying a driving voltage by which an ON/OFF state of both a liquid-crystal panel and an organic EL panel for displaying a single color can be controlled by a common driving method on the basis of the supplied driving voltage a liquid-crystal panel driving control step of controlling the driving of the liquid-crystal panel by applying an AC voltage to the liquid-crystal panel on the basis of the supplied driving voltage, and an organic-EL-panel control step of controlling the driving of the organic EL panel by applying an AC voltage to the organic EL panel on the basis of the supplied driving voltage.

According to this construction, a driving voltage by which the on/off state of both the liquid-crystal panel and the organic EL panel can be controlled by a common driving method is supplied, and driving is controlled.

A fourteenth construction of the present invention is such that, in the thirteenth construction, the driving voltage supplied in the common driving method and the voltage supply step is determined by the single color displayed on the organic EL panel.

A fifteenth construction of the present invention can include a driving method selection step of selecting a driving voltage and a driving method for driving a liquid-crystal panel and an organic EL panel in accordance with the display color displayed by the organic EL panel capable of displaying a plurality of colors, a driving voltage supply step of supplying the driving voltage selected in the driving method selection step, a liquid-crystal panel driving control step of controlling the driving of the liquid-crystal panel by applying an AC voltage to the liquid-crystal panel on the basis of the selected driving method and the supplied driving voltage, and an organic-EL-panel control step of controlling the driving of the organic EL panel by applying an AC voltage to the organic EL panel on the basis of the selected driving method and the supplied driving voltage.

According to this construction, a driving voltage and a driving method for driving the liquid-crystal panel and the organic EL panel according to the display color displayed by the organic EL panel are selected, and panel driving is controlled on the basis of the selected driving method and the selected driving voltage.

A sixteenth construction of the present invention is such that, in the fifteenth construction, the driving method selection step selects a driving voltage suitable for driving a display color displayed by the organic EL panel from among a plurality of driving voltages of different magnitudes, and selects a driving method of a duty ratio suitable for driving a display color to be displayed by the organic EL panel from among a plurality of driving methods of different duty ratios.

BRIEF DESCRIPTION OF THE DRAWINGS

The invention will be described with reference to the accompanying drawings, in which like elements are referred to with the numerals, and wherein:

FIG. 1 includes plan views showing the external construction of a wristwatch-type information device according to an embodiment of the present invention.

FIG. 2 is a sectional view of the wristwatch-type information device according to the embodiment when it is viewed from the AA' direction in FIG. 1.

FIG. 3 is a plan view showing each display area provided in an organic EL panel according to the embodiment.

FIG. 4 is a block diagram showing the electrical construction of the wristwatch-type information device according to the embodiment.

FIG. 5 shows a schedule management table created in a RAM of the wristwatch-type information device according to the embodiment.

FIG. 6 is a schematic view showing an example of the assignment of the common electrodes and the segment electrodes of a display section of the wristwatch-type information device according to the embodiment.

FIG. 7 is a waveform chart showing the waveforms of the segment electrodes and the common electrodes of the display section of the wristwatch-type information device according to the embodiment.

FIG. 8 shows driving characteristics of an LCD.

FIG. 9 includes diagrams showing driving characteristics of the organic EL panel.

FIG. 10 includes a schematic view showing an example of the assignment of the segment electrodes and the common electrodes of the display section of the wristwatch-type information device according to the embodiment.

FIG. 11 includes a waveform chart showing the waveforms of the segment electrodes and the common electrodes of the display section of the wristwatch-type information device according to the embodiment.

FIG. 12 shows a driving method management table stored by a panel driver of the wristwatch-type information device according to the embodiment.

FIG. 13 shows various voltage values in a case where the LCD and the organic EL panel of the wristwatch-type information device according to the embodiment are driven.

FIG. 14 shows various voltage values in a case where the LCD and the organic EL panel of the wristwatch-type information device according to the embodiment are driven.

FIG. 15 is a flowchart showing the flow of the processing of a CPU of the wristwatch-type information device according to the embodiment.

FIG. 16 includes schematic views showing an example of an operation in which schedule information is displayed on the display section of the wristwatch-type information device according to the embodiment.

DETAILED DESCRIPTION OF PREFERRED EMBODIMENTS

Preferred embodiments of the present invention will be described below with reference to the drawings. In these embodiments, a description is given by taking, as an example, a case in which a liquid-crystal panel and an organic EL panel are mounted in a wristwatch-type information device.

First, the external construction of a wristwatch-type information device is described below. FIG. 1 is a plan view when a wristwatch-type information device 100 according to the embodiment is viewed from the obverse-surface side. FIG. 2 is a sectional view of the wristwatch-type information device 100 when it is viewed from the AA' direction in FIG. 1.

As shown in FIG. 1(A), on a display section 110 of this wristwatch-type information device 100, the date, the day of the week, and the time are always displayed. In the example shown in FIG. 1(A), it is shown that the current time is December 8 (Friday), 13:45. Information which is always displayed on the display section 110 in this manner is hereinafter referred to as "always displayed information". This always displayed information is displayed by a liquid-crystal display (hereinafter referred to as an "LCD") which forms the display section 110.

This wristwatch-type information device 100 has a schedule management function for performing user schedule management, so that, for a predetermined period before the schedule starts (for example, for a period of 10 seconds 5 minutes before the schedule starts), as shown in FIG. 1(B), a message informing the user that there is a schedule is displayed. In the example shown in FIG. 1(B), it is shown that there is a meeting in room 203 at 14:00. Information which is displayed only for a predetermined period on the display section 110 in this manner is hereinafter referred to as "limited display information". This limited display information is displayed by a transparent organic EL panel which forms the display section 110.

Although not shown in FIG. 1(B), the limited display information is displayed in a state overlapping with the always displayed information which is displayed as in FIG. 1(A). That is, when viewed by the user, the limited display information is displayed in the foreground, and the always displayed information is displayed in the background.

Next, the internal construction of the wristwatch-type information device 100 is described. As shown in FIG. 2, the wristwatch-type information device 100 is constructed in such a way that a circuit board 4 is provided inside a housing formed of a cover glass 1, a case 2, and a rear lid 6.

On the rear-surface side (the lower portion of the figure) of the circuit board 4, a quartz oscillator 5 for generating a source oscillation signal having a reference frequency, and a battery 109 for supplying power to each section of the wristwatch-type information device 100 are provided.

In comparison, on the obverse-surface side (the upper portion of the figure) of the circuit board 4, an IC chip 3 for controlling various control processes (to be described later) is provided, an LCD 112 is provided above the IC chip 3 at a position spaced therefrom, and an organic EL panel 111 is provided further above the LCD.

The organic EL panel 111 is constructed as a transparent panel in which, from the side opposing the cover glass 1, a transparent glass, a transparent anode material, a hole transportation layer, an organic light-emitting layer, an electron transportation layer, and a cathode material (none is shown) are laminated in this order. The transparent electrode is a transparent material, such as ITO, having conductivity, and the cathode material is formed by a metallic thin-film having a low work function, such as, for example, calcium, magnesium, aluminum, etc. Another transparent material can be used instead for the transparent glass, such as transparent plastic, and a flexible material can also be used.

Since the organic EL panel positioned above the LCD 112 as described above is transparent, when viewed by the user, in the state in which nothing is displayed on the organic EL panel 111, it is possible to see the display of the LCD 112 which is under the organic EL panel 111 without the field of view being obstructed by the organic EL panel 111. Furthermore, even in the state in which information is displayed on the organic EL panel 111, not all the displayed contents of the LCD 112 are seen, and the rough contents thereof can be seen.

The display area of the organic EL panel 111 can be divided into three areas in advance according to the display colors thereof. FIG. 3 is a plan view when the organic EL panel is viewed from the obverse-surface side (the side opposing the cover glass 1). As shown in FIG. 3, the display area of the organic EL panel 111 is divided into a blue display area 111b for displaying blue, a red display area 111r for displaying red, and a green display area 111g for displaying green, from the upper portion of the figure (towards the time 12:00) toward the lower portion (towards the time 6:00). The display colors of these display areas 111b, 111r and 111g differ depending on the different organic materials used as organic light-emitting layers which form the respective display areas.

The wristwatch-type information device 1 is so designed that, when limited display information is to be displayed on the organic EL panel 111, one of the these three display areas 111b, 111r and 111g is selected for display. For example, in FIG. 1(B) described above, an example in which a message is displayed on the red display area 111r is shown. The wristwatch-type information device 100 has stored therein, in a table form (to be described later), information concerning on which display area the limited display information should be displayed, and performs a display process in accordance with the stored contents.

Next, referring to the block diagram shown in FIG. 4, the electrical construction of the wristwatch-type information device 100 will be described. As shown in FIG. 4, the wristwatch-type information device 100 includes an oscillation circuit 101, a frequency-dividing circuit 102, a CPU (Central Processing Unit) 103, a ROM (Read Only Memory) 104, a RAM (Random Access Memory) 105, an operation input section 106, a panel driver 107, a battery 109, an LCD 112, and an organic EL panel 111.

The oscillation circuit 101 generates a clock signal on the basis of the above-described five oscillation frequencies and outputs it to the frequency-dividing circuit 102. The frequency-dividing circuit 102 frequency-divides the clock signal supplied from the oscillation circuit 101, and outputs this signal, as a clock signal for internal processing, to each section of the wristwatch-type information device 100.

The ROM 104 has various control programs stored therein. The CPU 103 reads these control programs and controls each section of the wristwatch-type information device 100. At this time, the RAM 105 is used as a work area for the CPU 103.

Examples of the control programs stored in the ROM 104 can include a schedule management program for storing and outputting schedule information about the schedule of a user, and a character generation program for generating character data for displaying various types of information on the display section 110. As a result of the schedule management program being executed, a schedule management table for recording various types of schedule information input by a user is created in the RAM 105. The CPU 103 performs schedule management of the user while referring to this schedule management table.

The operation input section 106 detects a depressing operation of an operation switch 120 (see FIG. 1) by the user, generates an output signal corresponding to this depressing operation, and outputs it to the CPU 103.

The panel driver 107 can include, in addition to a controller (not shown), a driving method control circuit 107b and a driving voltage control circuit 107c. This panel driver 107, under the control of the CPU 103, performs driving control of the LCD 112, and at the same time, performs driving control of the organic EL panel 111. That is, in this embodiment, one panel driver 107 functions as a shared driver for driving both the LCD 112 and the organic EL panel 111.

The controller of the panel driver 107 has a driving method management table 107a stored therein, as shown in FIG. 4. In this driving method management table 107a, the driving voltage and the driving method to be used by the panel driver 107 are described. In this embodiment, the driving voltage and the driving method are collectively referred to as a "driving method". The controller of the panel driver 107 determines an appropriate driving voltage by referring to the driving method management table and instructs the driving voltage control circuit 107c so that the power-supply voltage supplied from the battery 109 is adjusted to the same voltage as the above-described driving voltage. Also, the controller of the panel driver 107 determines an appropriate driving method which should be used by the panel driver 107 by referring to the driving method management table 107a, and reports this method to the driving method control circuit 107b.

Here, referring to FIG. 5, a description is given of the stored contents of the schedule management table stored in the RAM 105. As shown in FIG. 5, in this driving method management table, "schedule date", "schedule time", "schedule contents", "display start time", "display time", and "display area" in which the schedule contents should be displayed, are provided in such a manner as to correspond to each other. All these pieces of information may be input by the user operating the operation input section 106 of the wristwatch-type information device 1. Alternatively, the display time and the display area may be determined by the CPU 103 executing the schedule management program rather than the user inputting them each time.

The example of FIG. 5 shows that there is a schedule for a meeting in room 203 from 14:00 on Dec. 8, 2001, and that the schedule contents are displayed in the red display area 111r of the organic EL panel 111 for 10 seconds from 13:55 of the same day.

In this embodiment, as described above, the panel driver 107 drives the LCD 112 and the organic EL panel 111 at the same time. In the following, a description is given of a construction in which the panel driver 107 functions as a shared driver.

In the foregoing, in order to perform driving without deteriorating the performance of the LCD, it is described that it is necessary to apply an AC voltage. On the other hand, although the organic EL panel is originally driven with a DC voltage, if an AC voltage is applied to this organic EL panel, it is known that, merely, light emission occurs when the direction in which the voltage is applied is the same as a predetermined reference direction, and light emission does not occur in the opposite case, and that there is no problem, such as the organic EL panel itself being damaged.

Therefore, in this embodiment, both the LCD 112 and the organic EL panel 111 are AC-driven. However, if the LCD 112 and the organic EL panel 111 are simply AC-driven only, the problem of "flickering" or "insufficient contrast" (to be described later) occurs. Therefore, in this embodiment, a driving frequency, a driving voltage, and a driving method when AC driving is performed are selected on the basis of the principles described below, thereby solving the above-described problems.

First, the selection of the driving frequency is described. FIG. 6(A) is a view showing an example of the assignment of common electrodes and segment electrodes when ⅓-duty multiplex driving is performed with respect to an LCD and an organic EL panel. FIG. 6(B) is a corresponding view showing to which of display segments a to g for displaying a character each common electrode and each segment electrode correspond. In FIG. 6(A), the display segments corresponding to a first common electrode COM0 are shown by hatching, the display segments corresponding to a second common electrode COM1 are shown by solid lines and the display segments corresponding to a third common electrode COM2 are shown by oblique lines. Display segments "a'" to "g'" are such that a segment group adjacent to the display segment group "a" to "g" is shown for reference. In the following description, a description is given by considering only the display segment group "a" to "g".

FIG. 7 shows a waveform of an AC voltage (hereinafter referred to as a "driving waveform") applied to the common electrodes and the segment electrodes of FIG. 6 in a case where a numeral "5" is displayed. In FIG. 7, a reference driving voltage is indicated by 3 Vb, and it is shown that, in addition to this driving voltage, the applied voltage levels are 0, Vb, and 2 Vb. When this driving voltage 3 Vb is applied between the common electrodes and the segment electrodes of the LCD, the display segments between those electrodes are turned on.

In a case where the common electrodes COM0 and segment electrodes SEG0 shown in FIG. 6(A) are considered, when the voltage between these two electrodes becomes equal to the driving voltage 3 Vb, the display segment a (see FIG. 6(B)) corresponding to the common electrodes COM0 and the segment electrodes SEG0 is turned on. In this case, since the forward/reverse direction of the voltage does not need to be considered due to the characteristics of the LCD, the voltage between the common electrodes COM0 and the segment electrodes SEG0 becomes as shown in "driving waveforms of COM0-SEG0 in the LCD" shown in FIG. 7. Therefore, the driving voltage 3 Vb is applied only during the period "ta" and the period "td" within the period "ta" to "td" which forms one frame, and the display segment "a" is turned on.

In general, in an LCD used in a digital watch, the frame frequency is set to at least approximately 25 Hz. Therefore, in the above-described example, the ON state of the display segment "a" is repeated two times during one frame period, that is, at a frequency of approximately 25 Hz×2=50 Hz. In general, when the frequency of the incident light is equal to or lower than approximately 50 Hz, since the display appears to flicker in the eyes of a human being, the display segment "a" in this case may be said to be on/off-controlled at the lowest frequency at which flickering does not occur.

Next, a case is considered in which the organic EL panel constructed as shown in FIG. 6 is driven by a ⅓-duty driving waveform such as that shown in FIG. 7.

In the organic EL panel, since the forward/reverse direction of the voltage needs to be considered, as indicated in "driving waveforms of COM0-SEG0 in the organic EL panel" of FIG. 7, voltages of −3 Vb to 3 Vb are applied between the common electrodes COM0 and the segment electrodes SEG0 in a stepped manner. Here, if it is assumed that a driving voltage 3 Vb is required for the organic EL panel 111 to emit light, the period during which the organic EL panel 111 emits light is only the period "ta" within one frame period. Therefore, in the case of the organic EL panel, the display segment "a" emits light repeatedly once in each frame period, that is, at approximately 25 Hz which is the same as the frame frequency. That is, since the frequency of the incident light with respect to the human eye falls below approximately 50 Hz, flickering occurs.

Therefore, in order to solve such a flickering problem, in this embodiment, the driving frequency supplied from the frequency-dividing circuit 102 is set to approximately twice the normal one (25 Hz), that is, approximately 50 Hz. In this case, since the organic EL panel 111 emits light at 50 Hz, which is the same as the driving frequency, flickering does not occur. Furthermore, the LCD 112 is turned on at 50 Hz×2=100 Hz, and, if anything, the display quality is improved more than in the conventional case.

As a result of setting the driving frequency of the panel driver 107 to approximately twice the driving frequency which is normally required by the LCD 112 in this manner, it becomes possible to cause the organic EL panel 111 to be appropriately driven in the same manner as when the LCD 112 is driven.

As described above, the upper limit of the conventional frame frequency of the LCD is approximately 25 Hz, and the upper limit thereof is approximately 60 Hz. Therefore, the phrase "approximately twice the driving frequency of the LCD" referred to herein refers to "approximately 50 Hz to approximately 120 Hz". However, if the frame frequency of the LCD itself is approximately 50 Hz or higher, even if this frame frequency is used without modification in the organic EL panel, it is estimated that flicker does not occur.

Next, the selection of a driving voltage and a driving method will be described. However, first, the characteristics of the LCD and the organic EL panel are described, and the conditions under which the individual panels are turned on are described.

FIG. 8 shows the relationship between the effective voltage with respect to the LCD and light transmittance. Since it is known that the LCD has cumulative response characteristics such that the LCD is turned on/off in response to the effective value of the voltage which is applied within a predetermined period, here, the effective value of the applied voltage (effective voltage) within one frame period is used as a variable in the X axis in the figure.

As shown in FIG. 8, the LCD has characteristics such that the light transmittance varies continuously with respect to the effective voltage. In particular, a very sharp variation is seen from a voltage Vth-LCD corresponding to a light transmittance of approximately 90% to a voltage Vsat corresponding to a light transmittance of approximately 10%. Here, the voltage Vth-LCD is defined as the minimum effective voltage required for the LCD to be turned on, and this is hereinafter referred to as a "threshold voltage Vth-LCD". Therefore, in order to turn on the LCD, it is necessary to apply an ON voltage Von-LCD larger than this threshold voltage Vth-LCD, and in order to turn off the LCD, it is necessary to apply an OFF voltage Voff-LCD smaller than this threshold voltage Vth-LCD. That is, in order to perform on-off control of the LCD, the above-mentioned Vth-LCD, Von-LCD, and Voff-LCD need to satisfy the relation described below:

$$\text{Voff-LCD} < \text{Vth-LCD} < \text{Von-LCD} \qquad (1)$$

Hereafter, the condition shown in this equation (1) is called the "turning-on condition of the LCD".

Next, FIG. 9(A) is a graph showing the relationship between electrical current and luminance in the organic EL panel. FIG. 9(B) is a graph showing the relationship between voltage and electrical current in the organic EL panel.

As shown in FIG. 9(A), the organic EL panel has characteristics such that the luminance varies continuously with respect to electrical current. In FIG. 9(A), the luminance required to secure satisfactory visibility when viewed by the human eye is denoted as X, and the electrical current required to obtain this luminance X is denoted as Y. Furthermore, in FIG. 9(B), the voltage required to obtain this electrical current Y is denoted as a required voltage Vth-EL.

Therefore, in order to perform on/off control of the organic EL panel, it is necessary that the ON voltage Von-EL which is applied to turn on the organic EL panel and the required voltage Vth-EL satisfy the relation shown below:

$$\text{Vth-EL} < \text{Von-EL} < \text{Von-LCD} \qquad (2)$$

Hereafter, the condition shown in this equation (2) is called "the turning-on condition of the organic EL panel".

It is known that, for the organic EL panel 111, the required voltage Vth-EL differs depending on the display color thereof. For example, in the case of a green display, the required voltage Vth-EL is 3.0 (V). A description will be given below of a driving voltage and a driving method in the case of a green display. In the following description, the threshold voltage Vth-LCD of the LCD 112 is set to 2.0 (V) and the driving voltage 3 Vb of the panel driver 107 is set to 4.2 (V).

First, regarding the OFF voltage of the LCD 112, the OFF voltage Voff-LCD is 1.4 (V) (=Vb), as can easily be understood when the voltage between the common electrodes COM0 and the segment electrodes SEG1, which are OFF in FIG. 7, is considered. Also, regarding the ON voltage of the LCD 112, since the effective value of the voltage between the common electrodes COM0 and the segment electrodes SEG0 in FIG. 7 may be determined, Von-LCD is $(((3 Vb)^2+Vb^2+Vb^2)/3)^{1/2}=2.68$ (V).

When the Voff-LCD=1.4 (V), Vth-LCD=2.0 (V), and Von-LCD=2.68 (V) are substituted in equation (1), the following is satisfied:

Voff-LCD (1.4 V)<Vth-LCD (2.0 V)<Von-LCD (2.68 V)

Since the turning-on condition for the LCD is satisfied, on/off control of the LCD 112 becomes possible.

On the other hand, regarding the ON voltage of the organic EL panel 111, since the cumulative response characteristics like those of the LCD 112 need not be taken into consideration, the voltage Von-EL applied in the period "ta" between the common electrodes COM0 and the segment electrodes SEG0 shown in FIG. 7 becomes=4.2 (V) (=3 Vb). When the Vth-EL=3.0 (V) and Von-EL=4.2 (V) are substituted in equation (2), the following is obtained:

Vth-EL (3.0 V)<Von-EL (4.2 V)

Since the turning-on condition for the organic EL panel is satisfied, on/off control of the organic EL panel 111 becomes possible.

As described above, when the driving voltage is set to 4.2 (V) and for the driving method, ⅓-duty multiplex driving is used, it can be seen that, while the LCD 112 is being driven, a green color can be displayed on the organic EL panel 111.

Next, assuming the case of a red display by ⅓-duty multiplex driving, a consideration which is the same as that described above is performed. In case of a red display, the required voltage Vth-EL of the organic EL panel 111 is Vth-EL=4.0 (V). Also, the threshold voltage Vth-LCD of the LCD 112 is 2.0 (V) in a manner similar to that described above. Also, regarding the driving voltage 3 Vb, in order that the driving voltage is made sufficiently larger than the required voltage Vth-EL=4.0 (V) of the organic EL panel 111, 3 Vb is set to 4.5 (V).

Initially, regarding the organic EL panel 111, Vth-EL is 4.0 (V), and Von-EL is 4.5 (V), so that the turning-on condition for the organic EL panel shown in equation (2) is satisfied, and on/off control becomes possible.

On the other hand, regarding the OFF voltage of the LCD 112, as can be understood by referring to FIG. 7, Voff-LCD is 1.5 (V) (=Vb). Also, the ON voltage Von-LCD of the LCD 112 is $(((3 Vb)^2+Vb^2+Vb^2)/3)^{1/2}=2.87$ (V).

When Voff-LCD=1.5 (V), Vth-LCD=2.0 (V), and Von-LCD=2.87 (V) are substituted in equation (1), the following is obtained:

Voff-LCD (1.5 V)<Vth-LCD (2.0 V)<Von-LCD (2.87 V)

This satisfies the turning-on condition for the LCD.

Here, a case is considered in which, as measures for improving the contrast of the LCD 112, the driving voltage 3 Vb is increased as 4.8 (V).

In this case, regarding the organic EL panel 111, Vth-EL is 4.0 (V) and Von-EL is 4.8 (V), so that the turning-on condition for the organic EL panel, shown in equation (2), is satisfied, and on/off control becomes possible.

On the other hand, regarding the OFF voltage of the LCD 112, Voff-LCD is 1.6 (V) (=Vb). Also, regarding the ON voltage of the LCD 112, Von-LCD is $(((3 Vb)^2+Vb^2+Vb^2)/3)^{1/2}=3.06$ (V).

That is, the difference between the OFF voltage Voff-LCD and the ON voltage Von-LCD of the LCD 112 is 3.06−1.6=1.46 (V).

Since this difference is greater than 2.87−1.5=1.37 (V)

which is the difference between the OFF voltage Voff-LCD and the ON voltage Von-LCD when the driving voltage 3 Vb is 4.5 (V), this is estimated to contribute to increased contrast.

However, in practice, Voff-LCD=1.6 (V) becomes a value close to the threshold voltage Vth-LCD=2.0 (V) of the LCD 112, and in the magnitude relationship such as Voff- LCD=1.6 (V) and Vth-LCD=2.0 (V), sufficient OFF characteristics cannot be obtained. Therefore, in the LCD 112, there is a risk that a state of always tending to be ON in which there is no contrast, that is, halftone, occurs.

Accordingly, in this embodiment, as measures for increasing the contrast of the LCD 112 without increasing the driving voltage 3 Vb, ½-duty multiplex driving is used as the driving method.

FIG. 11(A) shows waveforms when the red display area 111r is driven at ½ duty. FIG. 11(B) shows an example of the assignment of common electrodes and segment electrodes of the red display area 111r. FIG. 11(A) shows waveforms when the numeral "5" is displayed in the example of the assignment shown in FIG. 11(B).

A case in which a red color is displayed on the organic EL panel 111 by such ½-duty driving is assumed, and a case in which ⅓-duty driving is performed at a driving voltage 3 Vb=4.5 (V) is considered.

Initially, regarding the organic EL panel 111, Vth-EL is 4.0 (V) and Von-EL is 4.5 (V), so that the turning-on condition for the organic EL panel, shown in equation (2), is satisfied, and on/off control thereof is possible.

On the other hand, regarding the LCD 112, Voff-LCD is 1.5 (V) (=Vb), Vth-LCD is 2.0 (V), and Von-LCD is $(((3\ Vb)^2+Vb^2)/2)^{1/2}=3.35$ (V), and the turning-on condition for the LCD, shown in equation (1), is satisfied.

In addition, the difference between the OFF voltage Voff-LCD and the ON voltage Von-LCD of the LCD 112 becomes 3.35−1.5=1.85 (V). Since this difference is greater than the difference (1.37 (V)) between the OFF voltage Voff-LCD and the ON voltage Von-LCD during ⅓-duty driving, this contributes to increased contrast.

In addition, since Voff-LCD=1.5 (V) is sufficiently smaller than the threshold voltage Vth-LCD=2.0 (V) of the LCD 112, satisfactory OFF characteristics can be obtained.

As described above, in a case where the driving voltage 3 Vb is set to 4.5 (V) and ½-duty multiplex driving is used as the driving method, it becomes possible to display a red color on the organic EL panel 111 while on/off control of the LCD 112 is being performed satisfactorily.

Next, by assuming the case of a blue display, a consideration which is the same as that described above is performed. In the case of a blue display, the required voltage Vth-EL of the organic EL panel 111 is 5.0 (V). Also, the threshold voltage Vth-LCD of the LCD 112 is 2.0 (V) in the same manner as that described above. Furthermore, the driving voltage 3 Vb is set to 5.4 (V).

In this case, for the LCD 112, the ON voltage Von-LCD is $(((3\ Vb)^2+Vb^2+Vb^2)/3)^{1/2}=3.44$ (V). This is larger than Vth-LCD=2.0 (V), and is a sufficient value for ON control. However, the OFF voltage Voff-LCD is 1.8 (V) (=Vb), which is a value close to the threshold voltage Vth-LCD=2.0 (V). Therefore, there is a risk that halftone such as that described above occurs.

On the other hand, for the organic EL panel 111, the following is satisfied:

Vth-EL (5.0 V)<Von-EL (5.4 V)

This satisfies, up to a point, the turning-on condition of the organic EL panel of equation (2). However, there is a risk that a sufficient luminance cannot be obtained with the magnitude relationship of this degree.

Therefore, a case is assumed in which the value of the driving voltage 3 Vb is increased further, for example, the driving voltage 3 Vb is made to be 6.0 (V).

In this case, the turning-on condition of the organic EL panel of equation (2) is satisfied, and satisfactory ON/OFF control becomes possible.

In contrast, for the LCD 112, the ON voltage Von-LCD is $(((3\ Vb)^2+Vb^2+Vb^2)/3)^{1/2}=3.82$ (V). This is larger than Vth-LCD=2.0 (V), and is a sufficient value for ON control. However, the OFF voltage Voff-LCD is 2.0 (V) (=Vb), and this becomes the same value as the threshold voltage Vth-LCD=2.0 (V). This means that the LCD 112 becomes always turned on, and OFF control cannot be performed.

It is concluded from the above consideration results that, if the value of the driving voltage 3 Vb is only adjusted to satisfy the turning-on condition of the organic EL panel, a contrast problem of the LCD 112 occurs, which is undesirable.

Accordingly, in this embodiment, the driving voltage 3 Vb is adjusted and the driving method is changed, thereby satisfying the turning-on condition of the organic EL panel. Specifically, in the case of a blue display, instead of multiplex driving of ⅓ duty, static driving is adopted.

FIG. 10(A) shows driving waveforms in a case where the blue display area 111b is subjected to static driving. FIG. 10(B) shows an example of the assignment of common electrodes and segment electrodes of the blue display area 111b. In FIG. 10(B), for the display segments which are desired to be turned on, voltages of waveforms in mutually opposite phases are applied to the corresponding common electrode and segment electrodes. In contrast, for the display segments which are desired to be turned off, voltages of waveforms in phase are applied to the corresponding common electrode and segment electrodes.

In this static driving, assuming the above-mentioned case of a blue display, a consideration which is the same as that described above is performed under the conditions in which the driving voltage 3 Vb is 6.0 (V), the threshold voltage Vth-LCD is 2.0 (V), and the required voltage Vth-EL is 5.0 (V).

For the LCD 112, OFF voltage Voff-LCD=0 (V), Vth-LCD=2.0 (V), and Von-LCD=6.0 (V). Since the turning-on condition of the LCD, shown in equation (1), is satisfied, on/off control of the LCD 112 is possible.

On the other hand, also, for the organic EL panel 111, Vth-EL=5.0 (V) and Von-EL=6.0 (V) (=3 Vb). Since the turning-on condition of the organic EL panel, shown in equation (2), is satisfied, and the magnitude relationship between the required voltage Vth-EL and the ON voltage Von-EL is sufficient, satisfactory on/off control becomes possible.

As described above, in this embodiment, the driving voltage and the driving method are changed according to the display color in the organic EL panel, making satisfactory on/off control possible. FIG. 12 shows a driving method management table showing the correspondence between the display colors in the organic EL panel 111, and the driving voltages and the driving methods suitable for these display colors.

The panel driver 107 has stored therein a driving method management table such as that shown in FIG. 12, and determines an appropriate driving voltage and an appropriate driving method by referring to this driving method management table when the color reported from the CPU 103 is displayed.

An example of a combination of suitable driving voltages and suitable driving methods described in the foregoing is shown in FIG. 13. An example of a combination of driving voltages and driving methods, in which problems such as those described above occur, is shown in FIG. 14. In FIG.

14, the x mark shown below the OFF voltage value of the LCD shows that the OFF characteristics of the LCD 112 cannot be obtained. The ▲ marks shown below the OFF voltage value of the LCD show that the OFF characteristics of the LCD 112 cannot be sufficiently obtained, and the △ mark shown below the ON voltage value of the organic EL panel shows that the ON characteristics of the organic EL panel 111 cannot be sufficiently obtained.

As described above, since the green display area 111g may be driven at ⅓ duty, the red display area 111r may be driven at ½ duty, and the blue display area 111b may be driven by static driving, the common electrodes and the segment electrodes which form these display areas 111g, 111r, and 111b may be assigned as shown in FIGS. 6(A), 10(B), and 11(B), respectively.

In comparison, the LCD 112 needs to be driven by a driving method which differs depending on which color is displayed on the organic EL panel 111. Specifically, when the green display area 111g is driven, it needs to be driven by a driving method of /1;3 duty. When the green display area 111r is driven, it needs to be driven by a driving method of ½ duty. When the blue display area 111b is driven, it needs to be driven by a driving method of static driving.

Therefore, in order to cope with such a plurality of driving methods, the assignment of the common electrodes and the segment electrodes of the LCD 112 is made the same assignment as that of the static driving shown in FIG. 10(B).

For example, in the case of ½ duty, a voltage having the same driving waveform as COM1 in, for example, FIG. 11(A) is applied in advance to the common electrodes of the LCD 112. For the segment electrodes which are desired to be turned on, a voltage having the same driving waveform as SEG1 in, for example, FIG. 11(A) is applied. For the segment electrodes which are desired to be turned off, a voltage having the same driving waveform as SEG2 in, for example, FIG. 11(A) may be applied.

Furthermore, in the case of ⅓ duty, a voltage having the same driving waveform as COM0 in, for example, FIG. 7 is applied in advance to the common electrodes of the LCD 112. For the segment electrodes which are desired to be turned on, a voltage having the same driving waveform as SEG0 of, for example, FIG. 7 is applied. For the segment electrodes which are desired to be turned off, a voltage having the same driving waveform as SEG1 of, for example, FIG. 7 may be applied.

Next, the operation of the embodiment having the above-described construction will be described. The CPU 103 of the wristwatch-type information device 100 executes a schedule management program in order to periodically scan a schedule management table stored in the RAM 105. Then, the CPU 103 clocks the current time on the basis of the clock supplied from the frequency-dividing circuit 102. When this current time matches the display start time in the schedule management table, the CPU 103 reads the schedule contents and the display area from this schedule management table. Here, a case is assumed in which the current time supplied from the frequency-dividing circuit is 13:55, and this matches the display start time "13:55" in the schedule management table shown in FIG. 5.

Next, the CPU 103 starts a character display program, creates character data for displaying the schedule contents (here, 14:00 Room 203 Meeting), supplies this character data to the panel driver 107, and reports the read display area (here, the red display area 111r) to the panel driver 107.

Meanwhile, the controller of the panel driver 107 executes the routine shown in FIG. 15 in accordance with the instructions from the CPU 103. In FIG. 15, first, the panel driver 107 determines which color the reported display area is (step S1). Here, since the display area is the red display area 111r (step S1; red), the process proceeds to the next step S4.

In step S4, the controller of the panel driver 107 refers to the driving method management table 107a shown in FIG. 12, and instructs the driving method control circuit 107b to perform a driving method corresponding to red, that is, multiplex driving of ½ duty. In response to this, the driving method control circuit 107b performs a predetermined switching process, and performs a setting operation for performing ½ duty driving.

Next, the process proceeds to step S5, where the controller of the panel driver 107 refers to the driving method management table 107a, and reports a driving voltage corresponding to red, that is, 4.5 (V), to the driving voltage control circuit 107c.

In response to this, the driving voltage control circuit 107c performs a predetermined switching process, and varies the voltage supplied from the battery 109 up to the reported driving voltage 4.5 (V).

When the driving method is set in this manner, the panel driver 107 applies a predetermined voltage to the common electrodes and the segment electrodes on the basis of the character data and the display area supplied from the CPU 103, so that the schedule contents such as those shown in FIG. 1(B) are displayed. Also, the display state of the time information which is originally displayed on the LCD 112 is continued by the set driving method.

At this time, the panel driver 107 causes the schedule contents to be displayed in sequence, as shown in FIG. 16(A), 16(B), and 16(C), from the right end of the organic EL panel 111. As a result, a display form which is interesting when viewed by the user can be realized.

In the above-described example, a case is described in which a display is produced in the red display area 111r. However, when the limited display information is stored in the schedule management table in such a manner as to correspond to the blue display area, the controller of the panel driver 107 instructs the driving method control circuit 107b to perform a driving method (static driving) corresponding to blue (step S2), and instructs the driving voltage control circuit 107c to generate a driving voltage (6.0 (V)) corresponding to blue (step S3).

Similarly, in a case where the limited display information has been stored in the schedule management table in such a manner as to correspond to the green display area 111g, the controller of the panel driver 107 instructs the driving method control circuit 107b to perform a driving method (½ duty) corresponding to green (step S6), and instructs the driving voltage control circuit 107c to set the voltage to a driving voltage (4.2 (V)) corresponding to green (step S7).

According to the above-described embodiment, when the organic EL panel 111 is AC-driven, since the liquid-crystal panel and the organic EL panel are subjected to AC-driving control on the basis of a driving frequency which is required so that the limited display information which is the object to be displayed is displayed without flicker, a single panel driver 107 can be used as a shared driver.

Furthermore, a driving method suitable for a color to be displayed on the organic EL panel 111 is selected, and always displayed information is displayed on the LCD 112 on the basis of this driving method, whereas limited display information can be displayed on the organic EL panel 111.

It should be understood that the present invention is not limited to the above-described embodiment, and that various changes such as those described below are possible without departing from the spirit and scope of the present invention.

(1) Types of Always Displayed Information and Limited Display Information

In the embodiment, information related to date and time is used as always displayed information, and information related to a schedule is used as limited display information. However, the embodiment is not limited to this example. The always displayed information need only be information that a user wants to always display, and, for example, the always displayed information may be a pattern appropriate for the preference of the user, an overview of schedules, etc. The limited display information need only be information in which it is desired to attract the attention of a user, and, for example, the limited display information may be a time message which is reported periodically. Alternatively, in the case of a wristwatch-type display device having a communication function, the limited display information may be a reception reporting message, and furthermore, it may be information which is displayed in response to an event of a user only when that event occurs.

(2) Selection of Driving Frequency and Driving Method

In the embodiment, the values of the driving frequencies and the driving voltages and variations of the driving method are specifically disclosed. However, the embodiment is not necessarily limited to these disclosed contents.

The reason for this is that the driving frequency and the driving method to be selected according to the display color are determined by various conditions, such as the threshold voltage Vth-LCD of the LCD 112 and the required voltage Vth-EL of the organic EL panel 111, and can variously vary according to the way in which what kinds of LCD 112 and organic EL panel 111 are used.

In particular, the required voltage Vth-EL of the organic EL panel 111 differs depending on whether the organic material of the panel 111 is of a high molecular material or a low molecular material. The panel described in the embodiment is assumed to be a high-molecular-type organic EL panel, and in a low-molecular-type organic EL panel, the required voltage Vth-EL when a red color is displayed is higher than those of blue and green.

There is also a case in which the luminance characteristics differ depending on each color. For example, when attempts are made to obtain a fairly bright luminance of approximately 100 (cd/m$^2$) for each color, a case of displaying red may require a larger electrical current than a case of displaying green and blue. For this reason, a high voltage must be applied.

In addition to this, there is an influence of the visual sensitivity of a human being. When a full-color display like a television is produced by an organic EL panel, it is known that the visual sensitivity of a human being is high for green and red, and is low for blue. For this reason, when white is to be reproduced by superposing these three colors, it is necessary to emit light of a blue color strongly than the other colors. As a result, a larger electrical current is applied to cause a larger amount of electrical current to flow.

As described above, the reference when the driving frequency and the driving method are selected differs depending on various conditions. At any rate, a suitable driving frequency and a suitable driving method can be determined on the basis of the principles disclosed in this embodiment. Therefore, the designer of the panel driver 107 may appropriately determine a suitable combination of the driving frequency and the driving method, and the display color on the basis of the principles disclosed in this embodiment according to the way in which the kinds of LCD 112 and organic EL panel 111 are used.

(3) Assignment of Segment Electrodes and Common Electrodes

Examples of the assignment of the segment electrodes and the common electrodes during multiplex driving are shown in FIGS. 6 and 11. Of course it should be understood that the assignment is not limited to these examples.

Furthermore, in the embodiment, a segment-type LCD 112 and a segment-type organic EL panel 111 are described. However, a matrix-type LCD 112 and a matrix-type organic EL panel may also be used without departing from the spirit and scope of the present invention.

(4) Construction of Wristwatch-Type Information Device 100

Additionally, the construction of the wristwatch-type information device 100 is not limited to that described in the embodiment. For example, the top/bottom relationship between the organic EL panel 111 and the LCD 112 shown in FIG. 2 may be opposite. In this case, the LCD 112 is a transparent panel formed by a transparent member.

Furthermore, an example in which the display section 110 is circular in FIG. 1 is described. However, the shape is listened to this, and the shape may be another shape, such as an oval shape, a track shape, or a polygonal shape.

Furthermore, it should be understood that the construction of the operation switch 120 is not limited to the construction such as that shown in FIG. 1. If a larger number of switch groups is provided so that the user can easily input various characters, a user-friendly wristwatch-type information device can be provided.

(5) Forms of Display Areas the organic EL panel 111 need not have all the three display areas 111b, 111r and 111g, and may have one or two of these display areas.

For example, when the organic EL panel 111 is a single-color display formed by only the green display area 111g, there is no need to select the most suitable ones from among a plurality of driving voltages and driving methods each time according to the display color. That is, at the stage of the design of the panel driver 107, a driving voltage and a driving method suitable for a green display may be determined in advance, and a driving frequency which is required so that an object to be displayed of the organic EL panel is displayed without flicker may be determined in advance. In other words, the construction and the operation for selecting a driving method and a driving voltage are not needed when the display color of the organic EL panel 111 is a single color.

Furthermore, when the organic EL panel 111 has two of the display areas 111b, 111r and 111g, it is necessary to store a driving method corresponding to the three colors in the driving method management table 107a, and a driving method corresponding to two colors may be stored.

For example, when the organic EL panel 111 is formed of only the red display area 111r and the blue display area 111b, it is only necessary that the driving voltages and the driving methods corresponding to the red display area 111r and the blue display area 111b be stored in the driving method management table 107a, and the panel driver 107 may determine the driving method in accordance with the stored contents of this table. This applies to the case in which the organic EL panel 111 is formed of only the red display area 111r and the green display area 111g or to the case in which the organic EL panel 111 is formed of only the blue display area 111b and the green display area 111g.

Furthermore, it should be understood the shape of the display areas 111b, 111r and 111g is not limited to that shown in FIG. 3, and, for example, the display areas may also be circular and polygonal without departing from the spirit and scope of the present invention.

(6) Software and Hardware Configuration

It is described in the embodiment that a selection process of the above-described driving method is realized by software executed by the controller of the panel driver 107. However, the selection process is not limited to this example, and can also be realized by only a logic circuit, which is hardware inside the panel driver 107, or by combining a logic circuit, and a processing circuit including a controller and software.

Furthermore, it is necessary only that the CPU 103 performs a process of selecting a driving method, and the panel driver 107 performs panel driving control in accordance with the processed results. In this case, the term "panel driving control device" in the claims contains the CPU 103 as well.

(7) Types of Devices to be Mounted

Although in the embodiment, an example is described in which the LCD 112, the organic EL panel 111, and the panel driver 107 are mounted in the wristwatch-type information device 100, the embodiment is not limited to this example, and they can be mounted in a communication device such as a portable phone, a small music playback device such as an MP3 player, a mobile terminal such as a PDA, or various portable devices such as digital cameras.

According to the present invention, the liquid-crystal panel and the organic EL panel are controlled by AC-driving on the basis of a driving frequency which is required so that an object to be displayed is displayed without flicker when the organic EL panel is AC-driven. Therefore, it is possible to use a single panel driving control device as a shared panel driving control device.

According to the present invention, a driving voltage by which the On/off state of both the liquid-crystal panel and the organic EL panel can be controlled by a common driving method is supplied, and the liquid-crystal panel and the organic EL panel are controlled by AC-driving on the basis of this driving voltage. Therefore, it is possible to use a single panel driving control device as a shared panel driving control device.

According to the present invention, a driving voltage and a driving method for driving the liquid-crystal panel and the organic EL panel are selected according to the display color displayed by an organic EL panel capable of displaying a plurality of colors, and the liquid-crystal panel and the organic EL panel are controlled by AC-driving on the basis of this driving voltage and this driving method. Therefore, it is possible to use a single panel driving control device as a shared panel driving control device.

What is claimed is:

1. A panel driving control device, comprising:
   a liquid-crystal panel control device that controls the driving of a liquid-crystal panel by applying an AC voltage to said panel;
   an organic-EL-panel control device that controls the driving of an electro luminescence panel by applying an AC voltage to said panel; and
   a frequency supply device that supplies, to said liquid-crystal panel control device and said organic-EL-panel control device, a driving frequency which is required for the organic electro luminescence panel to display an object to be displayed without flicker when said organic electro luminescence panel is AC-driven,
   wherein said liquid-crystal panel control device and said organic-EL-panel control device control said driving on the basis of the driving frequency supplied by said frequency supply device.

2. A panel driving control device according to claim 1, the driving frequency supplied by said frequency supply device being approximately twice the driving frequency which is normally required for the liquid-crystal panel to be driven.

3. A panel driving control device according to claim 1, the driving frequency supplied by said frequency supply device being a frequency which is greater than or equal to 50 Hz.

4. A panel driving control device, comprising:
   a liquid-crystal panel control device that controls the driving of a liquid-crystal panel by applying an AC voltage to said panel;
   an organic-EL-panel control device that controls the driving of an organic electro luminescence panel by applying an AC voltage to said panel for displaying a single color; and
   a voltage supply device that supplies, to said liquid-crystal panel control device and said organic-EL-panel control device, a driving voltage by which the on/off state of both said liquid-crystal panel and said organic electro luminescence panel can be controlled by a common driving method,
   wherein said liquid-crystal panel control device and said organic-EL-panel control device control said driving on the basis of said supplied driving voltage.

5. A panel driving control device according to claim 4, the driving voltage supplied by said common driving method and said voltage supply device being determined by said single color displayed on said organic electro luminescence panel.

6. A panel driving control device, comprising:
   a liquid-crystal panel control device that controls the driving of a liquid-crystal panel by applying an AC voltage to the said panel;
   an organic-EL-panel control device that controls the driving of an organic EL panel by applying an AC voltage to said panel for displaying a plurality of colors;
   a driving method selection device that selects a driving voltage and a driving method for driving said liquid-crystal panel and said organic electro luminescence panel in accordance with the display color displayed by said organic electro luminescence panel;
   a driving method reporting device that reports the driving method selected by said driving method selection device to said liquid-crystal panel control device and said organic-EL-panel control device; and
   a driving voltage supply device that supplies the driving voltage selected by said driving method selection device to said liquid-crystal panel control device and said organic-EL-panel control device,
   wherein said liquid-crystal panel control device and said organic-EL-panel control device control said driving by the driving method reported by said driving method reporting device on the basis of the driving voltage supplied by said driving voltage supply device.

7. A panel driving control device according to claim 6, said driving method selection device
   selecting a driving voltage suitable for driving a display color displayed by said organic electro luminescence panel from among a plurality of driving voltages of different magnitudes, and selecting a driving method of a duty ratio suitable for driving a display color to be displayed by said organic electro luminescence panel from among a plurality of driving methods of different duty ratios.

8. A wristwatch-type information device, comprising:
a panel driving control device according to claim 1;
a liquid-crystal panel whose driving is controlled by said panel driving control device;
an organic electro luminescence panel whose driving is controlled by said panel driving control device;
a power-supply device that supplies power to said panel driving control device; and
a clock supply device that supplies, to said panel driving control device, a clock signal required for the panel driving control device to perform driving control.

9. A portable device, comprising:
a panel driving control device according to claim 1;
a liquid-crystal panel whose driving is controlled by said panel driving control device;
an organic electro luminescence panel whose driving is controlled by said panel driving control device;
a power-supply device that supplies power to said panel driving control device; and
a clock supply device that supplies, to said panel driving control device, a clock signal required for the panel driving control device to perform driving control.

10. A panel driving control method, comprising:
supplying a driving frequency which is required for an organic electro luminescence panel to display an object to be displayed without flicker when the organic EL panel is AC-driven;
controlling the driving of the liquid-crystal panel by applying an AC voltage to the liquid-crystal panel on the basis of said supplied driving frequency; and
controlling the driving of the organic electro luminescence panel by applying an AC voltage to said panel on the basis of said supplied driving frequency.

11. A panel driving control method according to claim 10, the driving frequency being approximately twice the driving frequency which is normally required for the liquid-crystal panel to be driven.

12. A panel driving control device according to claim 10, the driving frequency being a frequency which is greater than or equal to 50 Hz.

13. A panel driving control method, comprising:
supplying a driving voltage by which an on/off state of both a liquid-crystal panel and an organic electro luminescence panel that displays a single color can be controlled by a common driving method on the basis of said supplied driving voltage;
controlling the driving of the liquid-crystal panel by applying an AC voltage to said panel on the basis of said supplied driving voltage; and
controlling the driving of the organic electro luminescence panel by applying an AC voltage to said panel on the basis of said supplied driving voltage.

14. A panel driving control device according to claim 13, the driving voltage supplied in said common driving step and said voltage supply step being determined by said single color displayed on said organic EL panel.

15. A panel driving control method, comprising:
selecting a driving voltage and a driving method for driving a liquid-crystal panel and an organic electro luminescence panel in accordance with the display color displayed by the organic electro luminescence panel capable of displaying a plurality of colors;
supplying the driving voltage selected in said driving method selection step;
controlling the driving of the liquid-crystal panel by applying an AC voltage to said panel on the basis of said selected driving method and said supplied driving voltage; and
controlling the driving of the organic electro luminescence panel by applying an AC voltage to said panel on the basis of said selected driving method and said supplied driving voltage.

16. A panel driving control method according to claim 15, wherein said driving method selection step includes:
selecting a driving voltage suitable that drives a display color displayed by said organic electro luminescence panel from among a plurality of driving voltages of different magnitudes, and
selecting a driving method of a duty ratio suitable for driving a display color to be displayed by said organic electro luminescence panel from among a plurality of driving methods of different duty ratios.

* * * * *